April 30, 1968 N. BACHKO 3,380,422
CARGO VESSEL
Filed Jan. 13, 1966 6 Sheets-Sheet 1
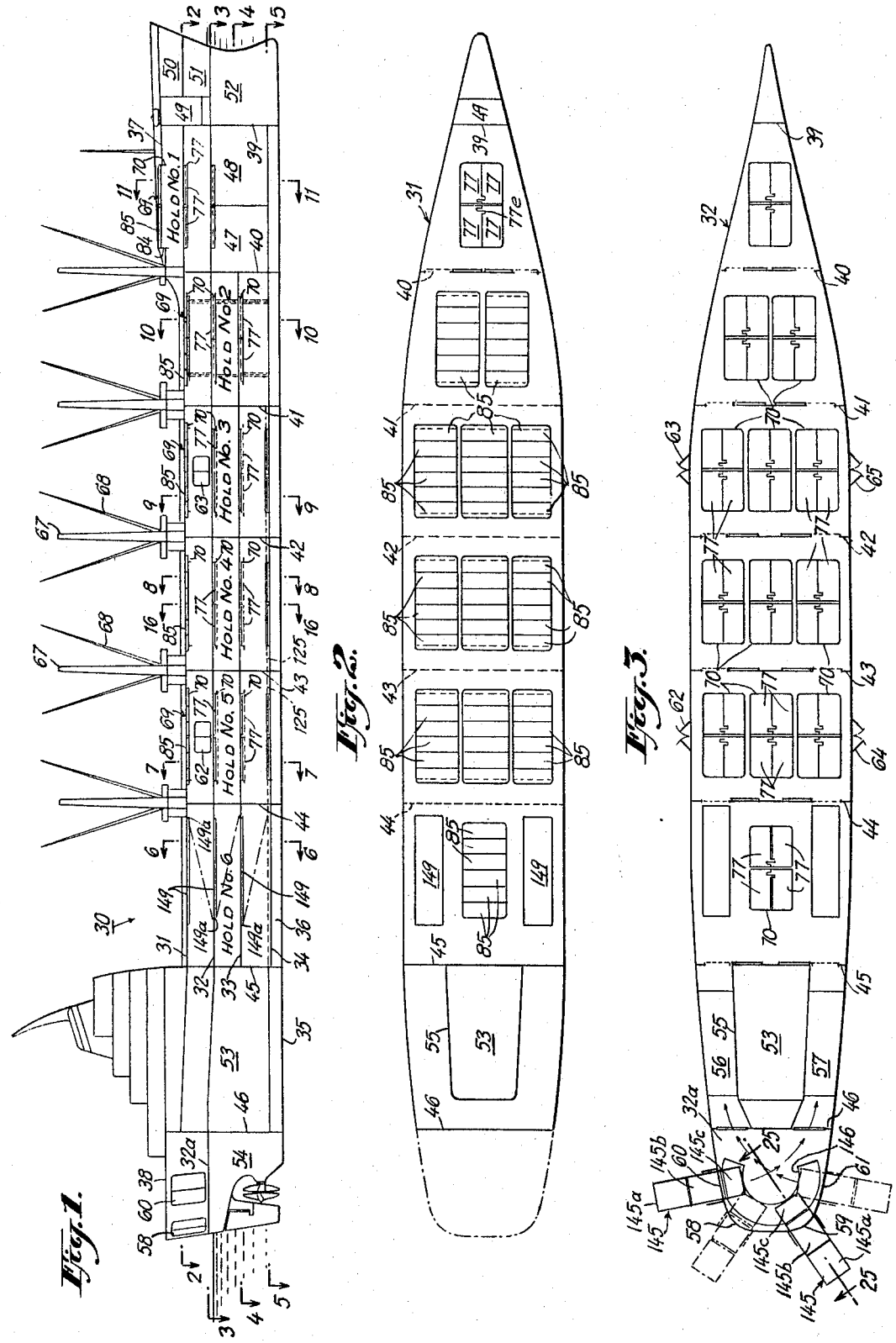

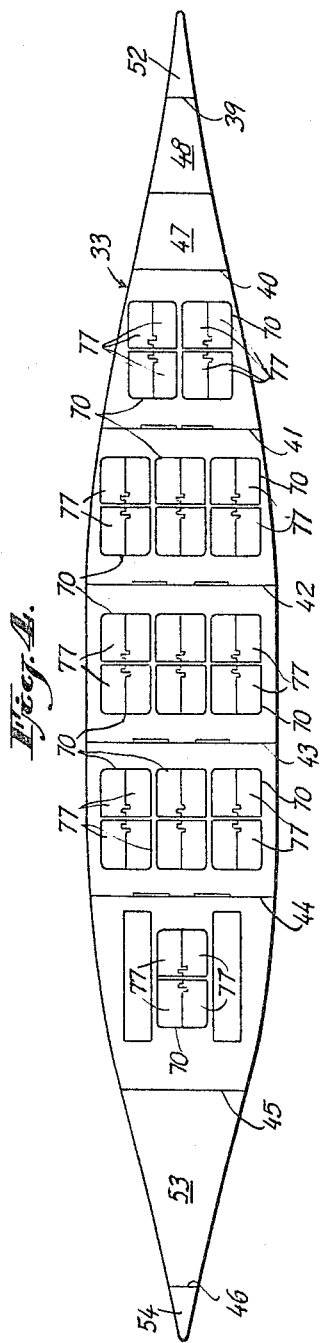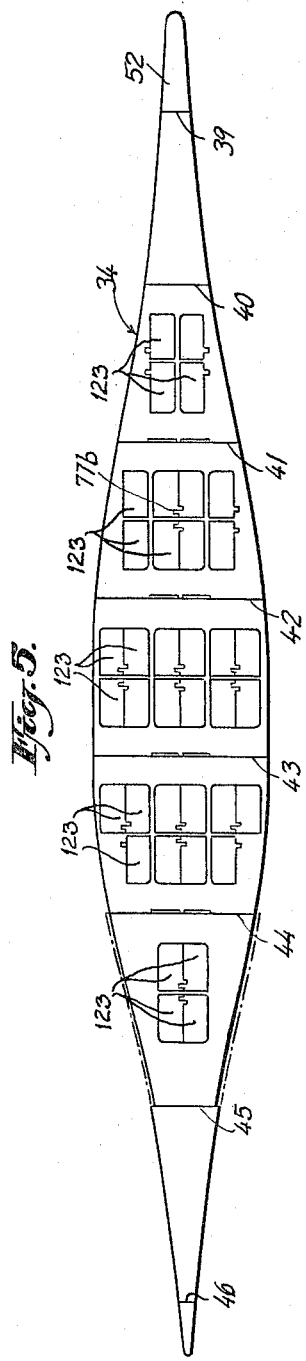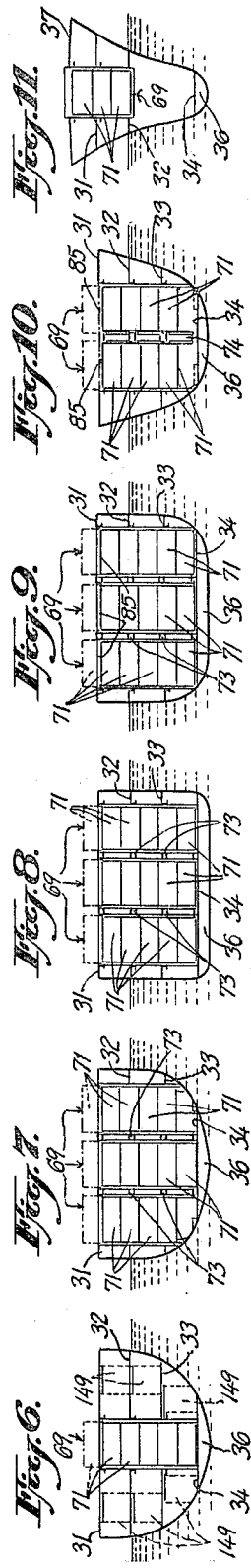

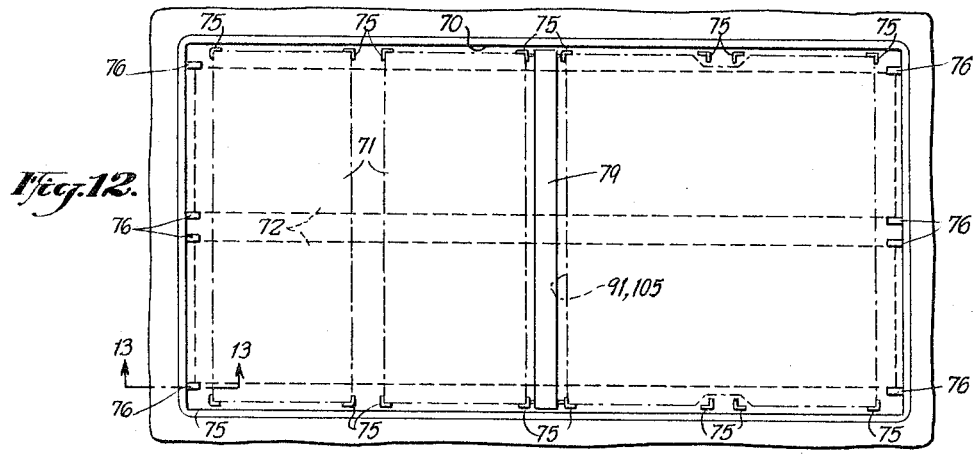
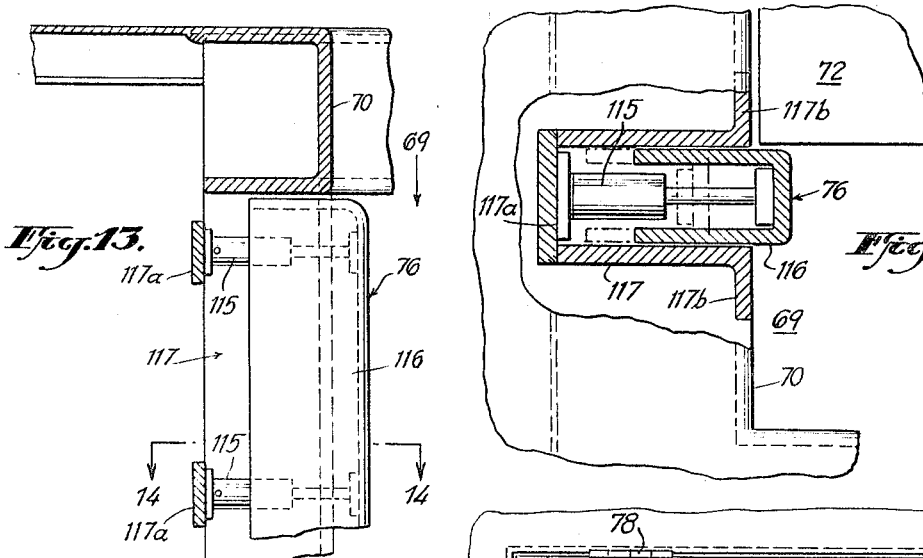
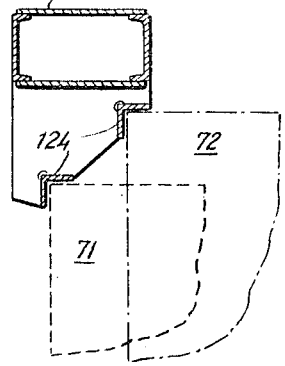
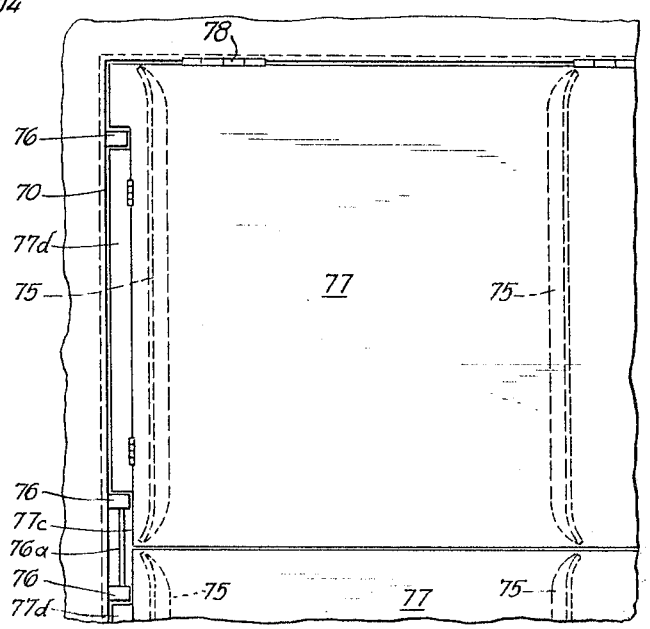

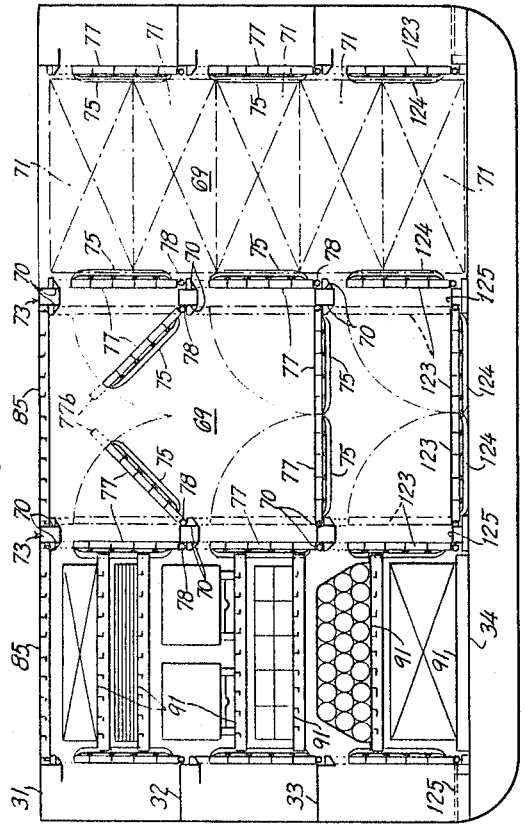
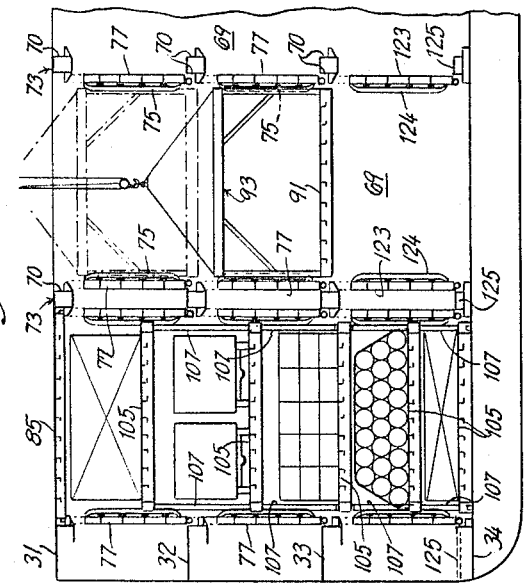
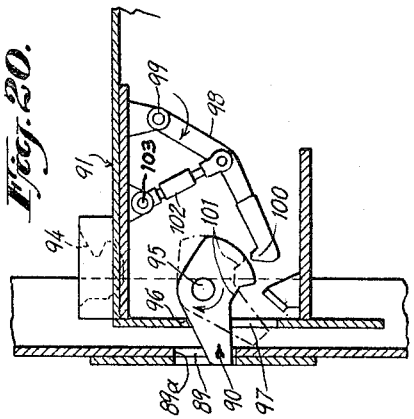
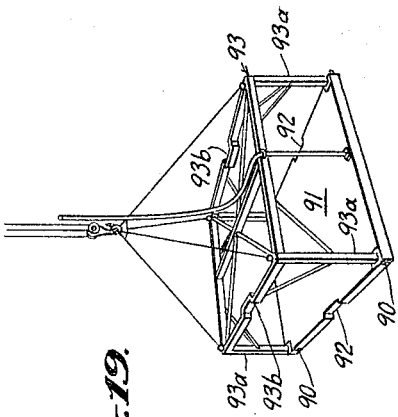
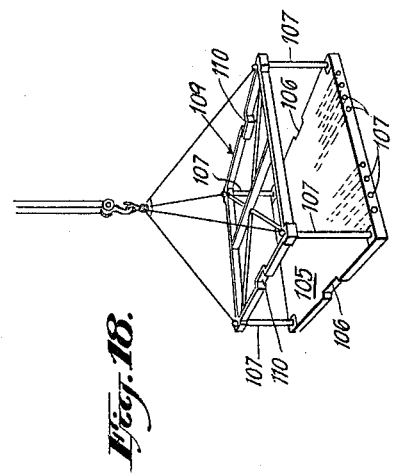

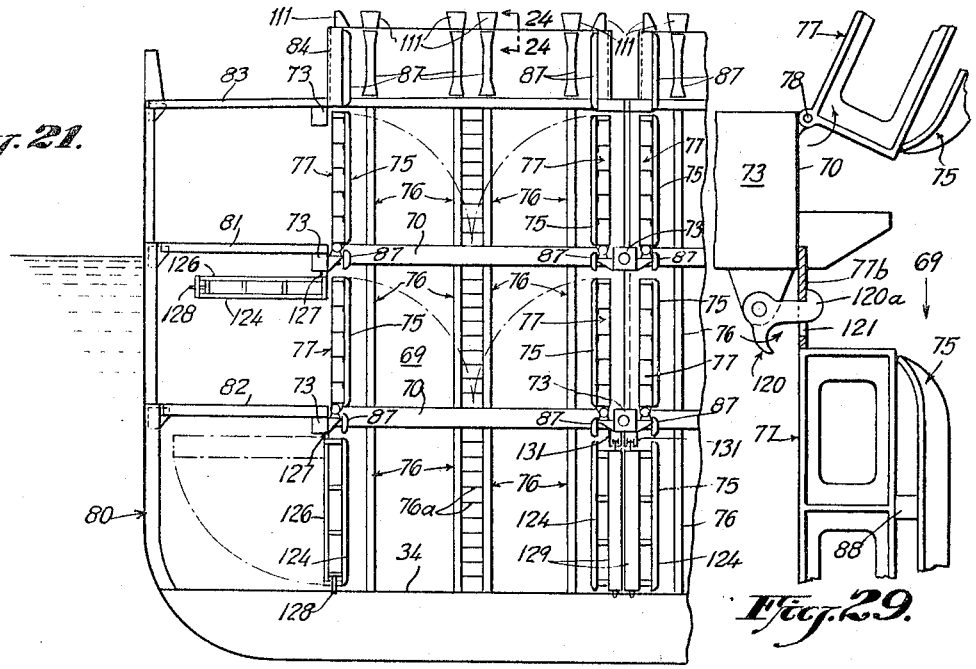

April 30, 1968  N. BACHKO  3,380,422
CARGO VESSEL
Filed Jan. 13, 1966  6 Sheets-Sheet 6

United States Patent Office 3,380,422
Patented Apr. 30, 1968

3,380,422
CARGO VESSEL
Nicholas Bachko, Port Washington, N.Y., assignor, by mesne assignments, to United States Lines, Inc., New York, N.Y., a corporation of Delaware
Filed Jan. 13, 1966, Ser. No. 520,482
36 Claims. (Cl. 114—72)

ABSTRACT OF THE DISCLOSURE

Movable and removable container guides; container guide elements attached to undersides of between-deck hatch covers to provide continuous hatchway guides when covers are swung vertically and latched; roller-mounted container guide elements movable to and from operational positions adjacent hatchway; upwardly swingable container guide elements; laterally telescoping container guide elements; latch-receiving apertures in such container guide elements for latching pallets, vans, etc. at elevational locations within hatchway; movable and removable roll-on, roll-off vehicle cargo ramps.

---

This invention relates to cargo carrying vessels, and more particularly to oceangoing vessels of the type which may be generally characterized as container ships.

The idea of loading a ship with large van-type cargo carrying containers, such as truck trailer bodies or the like, is not new. Either by on-board or dock loading cranes, such containers are lowered into the hold of the vessel through its cargo hatches and are stacked and secured one atop another. It is conventional to guide the containers in their downward movement and to retain them against subsequent lateral shifting by vertical guides for the purpose. The guides are attached within the hatchways of the ship at locations corresponding to the four corners of the standard sized containers to be received, and extend continuously downward to the inner bottom or tank top deck of the ship, the decking at any intermediate deck being eliminated within the hatchway areas. By reason of this conventional arrangement and attachment of the guides, the ability of the ship to additionally receive and store other cargo, which has not been initially loaded within such container, is curtailed.

Accordingly, the present invention provides a novel arrangement and construction of the container guides in such ships to afford convertibility of the ship for handling general cargo, or greater flexibility with regard to the mixed types of cargo, including cargo in van-type containers or the like, which the ship can conveniently load, unload, and carry. That is, the total cargo stored in any given between decks area of the ship may be contained in a fewer or greater number of one or more sizes of the van-type containers, or may be palletized on either of two types of master pallets as will be described, or may be general mixed cargo such as vehicle, break bulk, or dry cargo either loaded or not in ordinary crates or the like, yet the ship is adapted to efficiently accommodate all of the same in virtually any combination thereof. Although all of the cargo may be handled by the conventional lift-on, lift-off method, the invention further contemplates that vehicular cargo, or cargo contained in or hauled by motor vehicle, may also be handled by roll-on, roll-off methods.

Generally describing the invention, a ship having a conventional number of intermediate decks (referred to generally as "between decks") between its weather deck and its tank top, is provided with vertically aligned cargo hatches in each of its decks so that cargo may be lowered from above the weather deck to the lowest possible deck for stowage. The hatches are of particular size or multiples thereof for accommodating one or more side-by-side stacks of containers of common standard size extending in one or the other direction of the hatch. Of course, these vertically aligned hatches, which form hatchways, may be square, but if rectangular their long sides may extend in either the athwartship (transverse) direction, or in the fore and aft (longitudinal) direction of the ship. Each of the ship's cargo holds, as defined by the ship's watertight transverse bulkheads, has at least one such hatchway, depending upon whether more or less wing space is desired at each intermediate deck. However, in the preferred arrangement, the rectangular hatchways in each cargo hold are oriented in fore-and-aft direction and, considering the waterplane area between its defining watertight bulkhead stations, as many as possible are disposed in side-by-side relation in the athwartship direction at least within the main cargo holds, a fewer number and therefore more wing space being provided in the other holds.

Each of the large, between deck hatches within the hatchway is closed by four, quadrantly situated hatch covers in the preferred embodiment. The hatch covers lie flush with the top of their respectively associated decks when closed, and are hingedly mounted to swing upwardly in athwartship direction to their vertically standing, open position although, if desired, the hatch covers could be mounted to swing upwardly in the fore-and-aft direction as will subsequently be more fully understood. The transversely measured width of each of the quadrant-sized covers of a given hatch approximates the height of the between deck spacing thereabove and, when the cover is in its open position, either the upper edges of the covers or upwardly projecting portions on the respective covers engage and are locked against the overhead longitudinal girder construction adjacent the overlying hatch so that the upstanding open covers define fairly rigid longitudinal sidewalls of that portion of the hatchway which is above the deck to which the covers are hingedly attached.

Sectional lengths of the necessary container guides are attached to the underside of each of the covers for any given between deck hatch, the sectional lengths extending transversely with respect to the covers and being appropriately located such that they are in alignment with the respective container guide sections located thereabove when the cover is opened, thus to form interrupted, although substantially continuous, vertical container guides extending downwardly from the upper deck to the level of the deck on which the lowermost hatch covers are hingedly connected. If necessary, filler length guide sections are attached to the hatch coaming at each deck, and the respective upper and lower ends of all of the guide sections are appropriately flared and curved to assure smooth tracking of the containers within the guides as the containers are being loaded and unloaded.

To complete the continuity of these container guides across the between deck spacing to the deck below that on which the lowermost opened hatch covers are hinged, either or a combination of three principal alternative additional bottom guide section arrangements are available.

Where the lowermost between deck spacing is the area immediately above the tank top or other closed deck of the ship, the first of these alternatives provides hinged panels, which approximate the hatch covers and are similarly arranged but which are hingedly attached to the closed deck itself, to be swung upwardly when needed so that the container guide sections on their undersides will complete the full lengths of the guides within the hatchway. When in their closed position, they lie flush with the deck whose plating is appropriately recessed for the purpose. In a modified form of the first alternative, the hinged panels when closed lie atop the conventional flat plating of the tank top, in which instance raised grating is provided on adjacent areas of the tank top to the elevation corresponding to the thickness of the panels, including the container guide sections at their undersides, so as to provide a level deck for moving cargo laterally, even though some vertical spacing is lost in the area. However, the other two alternatives to be described could be employed to provide the bottom guide sections within the tank top cargo area, or within any other cargo area, without loss of vertical height, as will be seen.

The second of these alternatives provides respective and suitably braced bottom guide sections which are appropriately located and hingedly attached to the overhead, hatchway-adjacent longitudinal girder construction of the between-deck spacing which is below the lowermost of the opened hatch covers. The length of these bottom guide sections corresponds to the height of the between deck spacing which they serve and, thus, they may be swung upwardly in either athwartship or fore-and-aft direction and secured against the overhead of the between deck spacing when not needed, and may be swung downwardly and their lower ends secured to the deck or tank top therebelow when needed to complete the lengths of the respective container guides so that the latter then extend fully to the lowermost closed deck within the hatchway area.

The third alternative provides roller mounted bottom guide sections which may thus also be removed from their operational position when not needed. These sections, of course, have length corresponding to the height of the between deck spacing in which they are situated.

It will be appreciated that the three alternative forms of lower container guide sections might be selectively employed within the several between deck spacings of the ship depending upon space availability for mounting the same and other factors.

To accommodate containers of different length corresponding to the dimension of each hatchway in the opposite direction, which in the preferred embodiment is the longitudinal direction, laterally retractable guides are mounted on preferably fixed, respective vertical supports which are appropriately positioned to receive the four corners of the containers. Of course, removable hinged or roller type guides might be substituted to permit the fore-and-aft wing spaces to be free and clear when desirable. However, the preferred longitudinal container guides are permanently placed and are formed by aligned, between deck sections which extend downward through the hatchway from the hatch coaming at the weather deck to the tank top or other lowermost deck of the ship. The preferred telescopically retractable arrangement of these permanent container guides permits their retraction out of the hatchway, toward the outboard ends of the latter, when not in use so as to permit opening and closing of the aforementioned swingably mounted hatch covers which must pass the guides.

Alternatively, the guides at the forward and after ends of the hatchway may be of the conventional, non-removable and non-retractable type, in which case a suitable cutout of each of the swingable hatch covers must be provided so that they may clear the guides when opening and closing. A hingedly mounted flap is provided on each hatch cover to close this cutout area when the hatch cover is in closed position flush with the deck on which it is hinged.

Considering that quadrantly disposed hatch covers are employed to close the total area of the hatch at each intermediate deck, and that the hatchway is intended to accommodate containers having length equal to the full length of the hatchway (i.e., the combined lengths of the two hatch covers at either side of the hatch) as well as containers having length equal to the width of the hatchway, a removable king beam extends transversely across the hatch at its centerline to provide vertical support for the otherwise cantilevered corners of the hatch covers when closed.

At the upper or weather deck, the hatch is covered in a conventional watertight manner, excepting that in the preferred embodiment the hatch cover when closed is flush with the deck so as to facilitate the stowage of open deck cargo, which may include van-type containers, thereabove. In a modified arrangement, the hatch coaming at the upper deck projects upwardly, and container guide lead-in apparatus is hingedly or removably mounted thereon for reasons as will be explained.

In addition to van-type containers, the container guides themselves, or additionally provided pallet guides, accommodate standard sized master pallets which are previously loaded with cargo and are then loaded and unloaded from the ship in manner similar to the van-type containers. As will be seen, these master pallets may also be used as elevators within the hatchways. The invention contemplates that either of two types of master pallets will be accommodated, either of which may be ship's equipment, and one of which requires further modification of the guide rails which will accommodate the pallet. As will subsequently be more fully understood, the referred to modification of the guide rails is that of providing fairly closely spaced latch-receiving apertures along the vertical length of each for receiving laterally projectable and retractable latches of the one from of pallet so as to fully support and secure the pallet at any selected elevation within a hatchway. Thus, this form of pallet does not require that its load be supported by any cargo therebelow, as is the case using the alternative form of pallet.

The preferred embodiment of the invention further incorporates pairs of hingedly mounted ramps in, and forming a part of each deck which lies above the tank top to and including the weather or upper deck, the ramps in each pair being swingable in down direction to the adjacent deck below to provide passageways between decks for roll-on, roll-off cargo. Such vehicular traffic boards the ship at the level of the second deck (one deck below the upper deck) through portal doors either at the sides of the ship or at the port and/or starboard stern quarter thereof. To simultaneously accommodate rolling traffic at both stern quarters, two rail mounted extensible ramps are provided at the stern. The rail mounting provides mobility of each ramp to serve two or more entrance portals located at the stern of the ship within the region of the hull curvature which would otherwise be difficult of access from a dock. Thus, in addition to facilitating the stowage of vehicular cargo, or vehicle hauled cargo, on any deck of the ship, the arrangement provides additional stern-to-dock portals and therefore a greater total number of roll-on, roll-off cargo portals to shorten the time of loading of this type of cargo.

From the foregoing, it will be appreciated that the invention provides a cargo vessel having movable and removable guide elements which adapt the ship to receive and discharge containers and pallets, and movable and removable ramp elements which adapt the ship to receive and discharge vehicular traffic, yet the ship's capability for receiving and discharging conventional mixed or bulk cargo, either alone or together with either containers, pallets or vehicle cargo, remains unimpaired.

These and other objects, features and advantages will be more fully apparent from the following detailed description of the invention in its preferred embodiment including several modifications, when taken together with the accompanying drawings, in which:

FIGURE 1 is a sectional profile of a ship in accordance with the invention, the view being taken at the longitudinal centerline of the ship;

FIGURES 2 through 5, inclusive, are waterplane area showings of the ship of FIGURE 1 at the deck levels thereof, as indicated by lines 2—2, 3—3, 4—4, and 5—5, respectively, in FIGURE 1;

FIGURES 6 through 11, inclusive, are transverse sectional showings of the ship as seen from lines 6—6, 7—7, 8—8, 9—9, 10—10, and 11—11, respectively, in FIGURE 1;

FIGURE 12 is an enlarged plan view of a typical hatchway of the ship, the hatchway being shown in opened condition;

FIGURE 13 is a fragmentary side sectional elevation, to a greatly enlarged scale, of one form of guide rail apparatus within the hatchway of FIGURE 12, the section being taken as indicated at lines 13—13 of FIGURE 12; and FIGURE 14 is a fragmentary sectional view of the guide rail apparatus as seen from lines 14—14 of FIGURE 13;

FIGURE 15 is a fragmtntary plan view, to an enlarged scale, of one corner of a modified form of hatchway arrangement;

FIGURE 16 is a midship section of the ship of FIGURE 1, as seen from lines 16—16 of the latter figure, and being to an enlarged scale to show certain operational features of the ship; and FIGURE 17 is a fragmentary view similar to FIGURE 16 to show additional methods of utilizing the ships hatchways;

FIGURE 18 is a perspective showing, approximately to the scale of FIGURES 16 and 17, of one form of pallet and spreader arrangement which may be lowered into the hatchways of the ship;

FIGURE 19 is a similar view of a modified form of pallet and spreader arrangement; and FIGURE 20 is a greatly enlarged sectional showing of a feature thereof, the section being taken as indicated by lines 20—20 in FIGURE 19;

FIGURE 21 is a fragmentary showing of a midship section of a modified form of ship in accordance with the invention;

FIGURES 22 and 23 are fragmentary and enlarged front and side views, respectively, of the guide construction in a typical hatch cover as is mounted within the hatchways of the ship of either FIGURES 1 or 21;

FIGURE 24 is a greatly enlarged side sectional elevation of a feature of the ship of FIGURE 21, as seen from lines 24—24 in the latter figure;

FIGURE 25 is an enlarged fragmentary sectional view, taken as indicated by lines 25—25 in FIGURE 3, of the ship of FIGURE 1;

Figure 26:
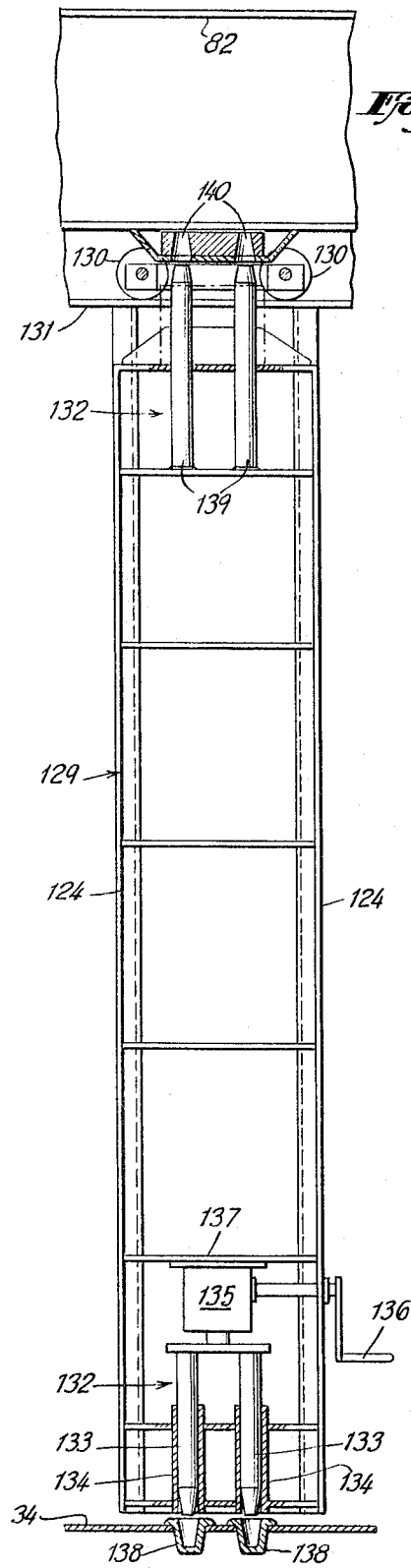
Figure 27:
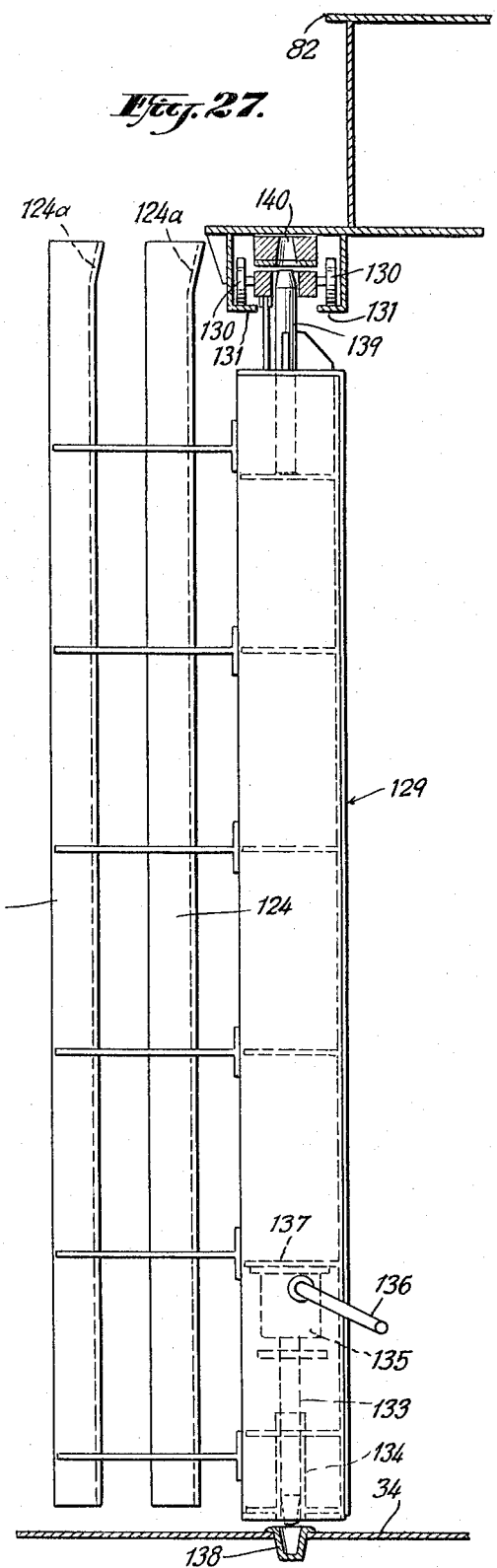

FIGURE 26 is an enlarged side view showing of a form of bottom guide section as may be incorporated in the ship of either FIGURE 1 or FIGURE 21; FIGURE 27 is a rear view of the construction as seen from lines 27—27 of FIGURE 26; and FIGURE 28 is a sectional view thereof as seen from lines 28—28 of either of FIGURES 26 and 27; and FIGURE 29 is an enlarged fragmented end edge showing of the manner of securing a typical hatch cover in its opened position.

Referring to FIGURE 1, in general arrangement the ship 30 includes a main deck 31 which is the weather deck; intermediate or "between" decks 32 and 33, deck 32 being the second deck and deck 33 being the third of the ship; a tank top deck 34 adjacent but spaced upwardly from the bottom line 35 to provide an inner bottom 36 for fuel or water ballast; a forecastle deck 37; and a poop deck 38. A plurality of transversely extending watertight bulkheads 39 to 46, inclusive, divide the ship 30 into compartments in conventional manner, including six cargo holds as indicated on the drawing. Hold No. 1, which lies between bulkheads 39 and 40, extends from the forecastle deck 37 to the deck 32 which lies above the deep tanks 47 and 48, whereas all of the other cargo holds Nos. 2 through 6, inclusive, extend from the deck 31 to the tank top deck 34. Forward of bulkhead 39 the ship includes the usual chain locker 49, storage lockers 50, 51, and a fore peak tank 52. Aft of bulkhead 45, the ship's engine room 53 and after peak tank 54 are situated below the second deck 32, although the machinery casing 55 (see FIGURE 3) extends upwardly of the deck 32 at its middle portion and thereby defines roll-on cargo passageways 56 and 57 on deck 32 outboard of the engine casing between bulkheads 45 and 46, these passageways 56, 57 to be utilized as will subsequently be described. It will also be noted that the stern portion 32a of the deck 32 provides a roll-on cargo traffic area for receiving such cargo through the stern loading portals 58, 59 and the side loading portals 60, 61, as will also be described. The ship also includes other side loading portals 62 to 65, inclusive (see FIGURES 1 and 3), for loading cargo at the second deck 32. Further, the ship 30 has deck house superstructure 66 located above main deck 31 and aft of the watertight bulkhead station 45. In addition, and as indicated in FIGURE 1, the ship has an appropriate number of masts 67 and booms 68 for self-loading and unloading of cargo from the respective of the cargo holds, although it will be understood that the ship might include any conventional alternative for such hoisting arrangement, such as either fixed or travelling gantry bridge cranes or the like.

Each cargo hold has one or more hatchways, generally designated by numeral 69, which extend downwardly from the topmost deck above the hold to the lowest deck within the hold and which are each defined by the cumulative vertically projected areas of an aligned series of individual hatches 70 at each deck above and within the hold. Each hatch 70, and therefore the open area of each hatchway 69, is identical in size to any other, and therefore FIGURE 12 is a typical plan of any opened hatchway 69. Because each hatchway is intended to accommodate both short length containers 71 (nominal dimensions 20 feet long x 8 feet wide) and long length containers 72 (nominal dimensions 40 feet long x 8 feet wide) and master pallets as will be described, the rectangular shaped open area dimensions of each hatch are slightly greater than 40 feet long x 20 feet wide appropriately to accommodate any of these several types and sizes of cargo platforms in the arrangements shown in FIGURE 12. Further, in the preferred embodiment, each hatchway in each hold is oriented with its long side in the fore-and-aft (longitudinal) direction of the ship as shown in FIGURES 2–4, although it will be understood that, where necessary or desirable, the size or directional disposition of any or all of the hatchways might be otherwise. Thus, as seen in the main deck plan, FIGURE 2, and considering that the ship 30 includes longitudinal girder construction extending along respective profile planes at either side of its centerline within holds Nos. 3 to 5 as generally indicated by reference numeral 73 in FIGURES 7–9, 16 and 17, and longitudinal centerline girder construction within hold No. 2 as generally indicated by numeral 74 in FIGURE 10, each of holds Nos. 1 and 6 have one such hatchway 69; hold No. 2 has two hatchways respectively located at either side of centerline girder construction 74; and each of the remaining holds Nos. 3 through 5 have three hatchways, one between and the others at the respective sides of longitudinal girder construction 73.

Referring to FIGURE 12, it will be understood that, in order to guide the short length containers 71 into and out from the hatchway 69 and to accommodate the same in transverse direction of the hatchway, the hatchway 69 has vertically extending, transverse container guides 75. Similarly, to guide the longer length containers 72 into and out from the hatchway, the latter also has vertically extending longitudinal container guides 76. It is apparent from FIGURE 12 that the number and spacing of the transverse guides 75 is such as to accommodate four columns of the stacked containers 71 within the hatchway (two at either side of center), and the number and spacing of the container guides 76 is such as to accommodate two columns of the stacked containers 72 within the hatchway (one at either side of center). In this connection, and by comparison of the deck plans of FIGURES 2 through 5 and the transverse sectional showings of FIGURES 6 through 11, it will be noted that the narrowing waterplane areas between the third deck 33 and the tank top deck 34 within holds Nos. 2, 3 and 5 cause elimination of the lowermost containers from certain of the outboard stacks thereof although, as will subsequently become apparent, the present invention permits and facilitates virtually full utilization of such space for the stowage of general mixed cargo.

From a comparison of FIGURES 3 and 4 with FIGURES 16 and 17 it will be understood that the transverse guides 75 are attached to the undersides of the swingable hatch covers 77 which close the respective hatches 70 at each of the decks 32 and 33 within cargo holds Nos. 2 through 6. Within hold No. 1, the transverse guide are similarly attached to the swingable hatch covers 77 at main deck 31, as will be apparent from FIGURES 1 and 2. Further, each hatch cover 77 is of the pontoon type to impart deck strength when closed for supporting heavy cargo thereon. Thus, it becomes apparent that the container guides 75 are effectively removed from the respective between decks areas above either of the decks 32 or 33 when the hatch covers 77 on the deck are closed, so that the between decks area can be better utilized for lateral loading and unloading of the wing areas and stowage of general mixed cargo at the relevant between deck level. For example, and referring to the general arrangement of the swingable hatch covers 77 as shown in FIGURE 16, where the hatch covers 77 at the decks 32 and 33 within either outboard hatchway 69 are closed and the middle hatchway 69 is opened above the level of deck 32, general mixed cargo stowed on the closed hatch covers 77 within the between decks area above deck 33 may be moved laterally towards, and unloaded through the middle hatchway 69 without disturbing any cargo at the outboard deck level thereabove. Reflection will indicate a variety of similar opened and closed combinations of the hatch covers 77 at the several hatchways and at the several deck levels which will likewise afford selective loading and unloading of particular cargo areas without disturbance of cargo within other areas for reducing loading and unloading time at dockside, and for increasing the number of available cargo areas at any given time during a voyage involving a number of ports of call. Furthermore, and because of the availability of the guides 75, the ship remains essentially a container ship whose cargo holds may be partly or completely filled with container-loaded cargo.

On runs where more general mixed cargo and less containerized cargo is anticipated, a modified form of ship 80, whose midship section is indicated in FIGURE 21, might be utilized to provide more wing space of a permanent type at each between decks level 81 and 82. That is, only two hatchways 69 as described herein are situated in transversely adjacent relation at either side of centerline within each cargo hold, the decks being of a permanent type at the respective outboard sides of the two hatchways, and being continued across the hatchways by the hingedly mounted hatch covers 77, having the container guides 75 attached at their undersides, when the same are closed. Thus, as in the preferred embodiment, when the hatch covers 77 are in their opened, vertical position, the hatchways 69 have guides therein for receiving containers. Of course, the arrangement shown in FIGURE 21 might be substituted for the hatchway arrangement in any appropriate hold of the ship 30 of the preferred embodiment, if desired.

Referring now to FIGURES 3 and 4, the preferred arrangement provides four, quadrantly situated hatch covers 77 for closing the hatch 70 within each hatchway 69 at each of the between decks 32 and 33, each hatch cover being hingedly mounted at its outboard side for upward swinging movement in the athwartship direction from its horizontal, or closed, position. Simlarly, wthin hold No. 1, the hatch 70 at main deck 31 is closed by four hatch covers 77. The hinge means at each hatch cover is generally indicated by numeral 78. A removable king beam 79 extends transversely at the centerline of each hatchway for supporting the respective, otherwise cantilevered, inboard corners and ends of the four hatch covers 77 when closed, and for removal only when the longer containers 72 are to be accommodated within the hatchway 69, as indicated in FIGURE 12. It will also be understood from FIGURE 16, for example, that the outboard or hinged edge side of each cover 77 abuts against the coaming of its hatch 70 and the longitudinal guide construction 73, and is thereby additionally supported when in closed position.

The width of each hatch cover 77 is substantially equal to the height of the between deck area thereabove so that, when the cover is opened, its transverse container guides 75 substantially span the height of the deck area. Thus, the vertically aligned guide sections on the opened hatch covers form substantially continuous container guides to the uppermost deck above, except for interruption at the hatch coaming of the deck above each aligned cover. Where necessary or desirable, such interruption may be substantially eliminated by attachment of filler guide sections 87 to the coaming at any deck in alignment with the guide sections on the opened hatch covers as illustrated in FIGURES 16 and 21, the latter figure showing the filler guide 87 attached to an upwardly projecting type of hatch coaming 84 at the main or weather deck 83 and as appears at the forecastle deck 37 of the preferred embodiment. These filler guides simulate the guide sections 75 in construction.

The hatch covers 77 are raised and lowered by any conventional means (not illustrated) and, when raised, are secured in their upstanding positions by respective spring biased latches 120 (FIGURE 29) each of which is pivotally mounted at the overhead and appropriately located adjacent the hatchway 69 within each between decks area for engaging a catch opening 121 of one of the hatch covers 77. Where the width of the cover 77 is less than the height of the between decks area, a latch extension 77b (see FIGURES 2–5) of the hatch cover may be provided at its free edge, in co-mating fashion with the adjacent hatch cover as shown, for the catch 121 to thereby avoid undesirable projection of the latch 120 below the overhead construction 73 to which it is attached. The latch 120 is normally spring biased to its horizontal, latching position as shown in FIGURE 29 and, to release the cover 77, is pivoted downwardly against its bias so that its hooked forward end 120a disengages the catch opening 121.

Referring to FIGURES 1 and 2, it will be understood that each hatch 70 at the main deck 31 is covered by hatch covers 85, which may be of conventional type, but which preferably lie flush with these decks when closed, as shown, to facilitate the storage of containers 71, 72 or other cargo thereon. The hatch 70 at the forecastle deck 37 may have upwardly projecting coaming 84 of the type more clearly illustrated at the main deck 83 of ship 80 in FIGURE 21, in which case the hatch is closed by any conventional cover.

FIGURES 22 and 23 show enlarged detailed front and side views of a typical hatch cover guide section 75. The guide is formed of 6″ x 6″ heavy angle iron attached, as by welding, to the underside of the hatch cover 77 and facing in the appropriate direction and positioned as indicated in FIGURE 12 for receiving and guiding one of the vertical corner edges of a container 71. The projecting edge 75a of each guide 75 is flared outwardly, as at 75b, at both its top and bottom ends to provide an appropriate lead-in to facilitate slidable movement of the container 71 into the same as shown in FIGURE 22. For similar reason, and as shown in FIGURE 23, the guide face 75c has upper and lower ends which are curved, as at 75d towards the plane of the hatch cover 77. The upper and lower flared ends 75b of the projecting edge 75a of the guide may be curved towards the hatch cover 77, as indicated in FIGURE 23. Any of the filler guides 87, of course, has similarly flared and curved upper and lower ends for the same purpose.

It will be noted that the guide face 75c is spaced away from the underside 77a of the hatch cover by spacers 88, and that the guide face 75c also includes vertically spaced apart apertures 89 along its length. The apertures 89 provide ledges for receiving the outwardly projecting latch elements 90 (see FIGURES 19 and 20) for supporting one type of pallet 91 at virtually any elevation within the hatchway 69. Referring to FIGURE 19, this type of pallet 91 is flat and square with nominal dimensions 20 feet x 20 feet such that its corners will be received and guided by the four outermost container guides 75 within the halfopening of any hatchway 69, as indicated in FIGURE 12. In this connection, it will be noted that the two side edges of the pallet 91 which will extend longitudinally of the ship within the hatchway are appropriately notched as at 92 (FIGURE 19), to clear the two pairs of innermost guides 75 within the half-opening of the hatchway. FIGURE 19 shows the pallet 91 attached to a spreader frame 93, as is a conventional means for hoisting and lowering palletized cargo. However, it will be noted that the spreader frame 93 has downwardly projecting legs 93a of any appropriate length to provide clearance for the cargo situated on the pallet 91, the lower ends of which have a conventional hydraulically actuated twist-type pallet lock (not shown) for engaging and locking into an appropriate recess 94 (FIGURE 20) at the respective corners of the pallet 91. The appropriate side edges of the spreader frame 93 are notched as at 93b to pass the referred to innermost guides of the hatchway in the same manner as the pallet notches 92.

The referred to latches 90 at the outboard facing sides of each of the four corners of the pallet 91 are shown in detail in FIGURE 20. The latch 90 is pivotally mounted, as at 95, and is spring biased by torsion spring means (not shown) towards its outwardly projecting position whereat it engages one of the latch receiving apertures 89 of the associated container guide 75, as indicated by the full line showing in FIGURE 20. In this projecting condition the latch 90 projects horizontally and is prevented from further upward movement by a stop 96 formed by the top of the pallet aperture 97 through which the latch projects. It becomes apparent that, upon lifting the pallet 91 when its latches 90 are in their projecting positions, the latches 90 will pivot downwardly against their spring bias upon contact with the upper edge 89a of the guide aperture 89. A hinge 98 is pivotally mounted on the pallet by a shaft 99 at one of its ends, the hinge 98 being spring biased, by torsional spring means (not shown) at the shaft 99, in the direction of upward swinging movement as indicated by the arrow in FIGURE 20. The opposite end of the hinge 98 has a latch 100 for engaging an appropriate recess 101 at the rearward end of the latch 90 to normally retain the latter in its retracted position, against the spring bias of the latch 90, as indicated by dotted lines in FIGURE 20. A hydraulic ram actuator 102, whose details are not illustrated is pivotally mounted on the pallet 91, as at 103, and, when actuated, urges the hinge 98 against its spring bias to release the latch 90 so as to permit the latter to swing outwardly to its projected position engaging a guide aperture 89. The hydraulic ram actuator 102 is retracted to cause automatic locking of the latch 90 in its retracted position when the pallet is lifted from the hatchway, as aforesaid. Of course, any other conventional mechanism for causing projection and retraction of the latch 90 as described might be used.

The hatchway 69 at the left side of FIGURE 16 shows pallets 91 so latched to the container guides 75 at various elevations within the hatchway, and it will be apparent that these pallets 91 permit maximum utilization of the cargo space within the hatchway. Further, referring to the hatchway 69 at the right side of FIGURE 7, it is seen that, with its latches 90 retained in their retracted positions, the pallet 91 in conjunction with the spreader frame 93 may be utilized as an elevator within any hatchway 69 since upward and downward movement of the pallet is accurately guide by guides 75.

It should further be noted that pallets of the type of pallet 91, but of different size, may also be supported within the hatchways 69 so long as the undersides of the hatch covers 77 have appropriately positioned pallet guides, having latch receiving apertures 89, attached thereto. Where additional pallet guides for the purpose (not illustrated) are used, they may be positioned intermediate the guides 75 as illustrated in FIGURE 12. In addition, it should be noted that the pallet guides and pallet locks 90 need not be at the extreme corners of such pallets 93 since the notched edges 92 of the pallet, as they slidably engage the guides 75, will adequately guide the pallet in upward and downward movement. Of course, the pallet 91 is of the pontoon type having adequate strength to support the load to be placed thereon.

A second type of pallet which may be utilized in loading, unloading and storing cargo within the hatchways 69 is illustrated in FIGURE 18. This pontoon type pallet 105 does not include a latching means for supporting the pallet on the container guides 75 and therefore always slides freely between the appropriate container guides 75. The preferred form of the pallet 105 has nominal dimensions 20 feet x 20 feet, and has side notches 106, so that its positioning between the transverse container guides 75 and manner of entry into the half-opening of any hatchway 69 are the same as described with respect to the pallet 91. However, the pallet 105 is provided with detachable stanchions 107 at its four corners for engaging the underside and supporting any similar pallet 105 placed thereabove within the hold. The stanchions 107 lock to the upper surface of the pallet 105 in any conventional manner (not illustrated), and have appropriate means (not shown) at their upper, free ends for locking into the underside of the pallet next above so that a cargo column formed by a stack of pallets 105 will appear as illustrated in the hatchway 69 at the left side of FIGURE 17. When detached, the four stanchions 107 are stowed within the hollow pontoon construction of the pallet 105 itself, as illustrated in FIGURE 18, and it becomes apparent that a number of sets of stanchions, four in each set and each set of different length, may be stored within the pallet 105 and selectively utilized to increase the utility of the pallet in loading cargo of varying heights. A spreader frame 109 is employed when lifting and lowering the pallet 105, and it will be noted that the appropriate side edges of the frame 109 are notched, as at 110, to pass the intermediate container guides 75 within any hatchway 69, as in the previously described embodiment.

Of course, the spreader frames 93 and/or 105 may be a part of ship's equipment and can be stored atop the topmost pallet as the latter are stowed in any hatchway 69.

Where the hatch coaming at the upper deck is of the upwardly projecting type as illustrated by the coaming 84 in FIGURE 21, it is found that a container or pallet lead-in device 111, as illustrated in detail in FIGURE 24, is desirably employed to guide the sometimes swinging container or pallets into the guides 75 and 76 of the hatchway. The devices 111 are also desirably employed where the cornermost adjacent guides 75, 76 of the hatchway are very closely spaced, and might otherwise interfere with the lowering of containers into the other. If desirable, the device 111 might also be used where flush type coaming appears at the upper deck. Referring to FIGURES 21 and 24, the coaming lead-in device 111 is preferably hingedly connected at its rearward end extension 111a to the outboard edge 84a of the coaming 84 so that, using its handle 111e, it is manually swingable to its dotted line position as shown in FIGURE 24 when not in use to permit placement of the weather deck hatch covering over the hatch. The preferred embodiment includes any suitable type of releasable hinge latch 112 at the hinge point 113 to lock the device 111 in its operational position as shown by full lines in FIGURE 24. Guides 114, welded to the coaming 84, assure proper positioning of the device 111. Alternatively, the device may be removable altogether, or made slidable along the coaming 84 to alternately service more than one container guide 75 or 76 and thereby reduce the total number of devices 111 which are required at each hatchway.

As seen in FIGURE 21, the sidewalls 111b, 111c of the device 111 are laterally flared and, as shown by FIGURE 24, the face 111d of the device is slanted, to facilitate the sliding of the lowermost corners of the containers or pallets thereon. Each device 111 is positioned in line with its associated container guide 75 or 76 (or coaming filler guide 87, if included), and it will be understood that an appropriate number of such devices 111 will be necessary to guide the containers or pallets into the hatchway.

Referring now to the preferred form of longitudinal container guides 76 as illustrated in FIGURES 12, 13 and 14, a suitable plurality of hydraulically actuated rams 115 mount the vertically extending and inverted U-shaped guide rail 116 for projecting and retracting movement within a vertically extending casing 117 which is attached, as by welding, between the coamings of the hatches 70 at each deck within the hatchway 69. The rams 115 are attached to the rear plate 117a of the casing, and are actuated by conventional means, not shown. Of course, the rams 115 might be electrically or mechanically actuated, if desired, and retraction of the guide rail 116 is necessary to permit opening and closing of the swingably mounted hatch covers 77 as previously described. In this connection, it will be noted that the fixed position of the casing 117 under the hatch coaming is such as will not block the movement of the covers 77. Projection of the guide rails 116, in conjunction with the fixed lateral extension 117b of the casing 117 (at either side thereof, depending upon the location of the guide 76, as will be apparent by reference to FIGURE 12), forms the angle-shaped container guide 76.

Alternatively, the guides 76 may be of a fixed, non-retractable type extending continuously from the topmost hatch to the lowermost deck within the hatchway, as indicated in FIGURE 21. In such case, and as shown by FIGURE 15, each hatch cover 77 has a cut-out 77c at the end thereof adjacent the guides 76 so that, during the raising and lowering of the cover 77, the guides 76 do not interfere with the movement of the cover. However, when the cover 77 is in its closed position, its cut-out 77c is closed by a hinged panel 77d, as shown.

As will be noted from FIGURES 15 and 21, ladder rungs 76a may be attached between either the fixed guides 76, or between the guide casings 117 of the centermost guides 76 in the hatchway.

Referring now to the manner in which the container guides 75 are continued downwardly below the third deck 33 to the tank top deck 34, FIGURES 1, 5, 16 and 17 show a preferred arrangement which provides upwardly swingable hinged hatchway plates 123 which simulate the provision of hatch covers at the tank top deck 34. That is, the plates 123 are of the same size, and function in the same manner as the hatch covers 77, and include bottom guide sections 124, similar to guides 75, at their undersides. Thus, when the plates 123 are in their upstanding positions as shown in FIGURES 16 and 17, the bottom guide sections 124 are aligned with the guides 75 of the opened hatch covers 77 thereabove so that containers will be guided fully to the bottom of the hatch 69. The tank top plating may be appropriately recessed to receive the plates 123 and guides 124 such that the plates lie flush with the deck when closed on the latter or, alternatively, raised deck grating 125 (FIGURES 1, 16 and 17) may be provided on the deck areas between the plates 123.

Alternatively, and as illustrated at the left hand side of FIGURE 21, the bottom guide sections 124 may be respectively attached to individual vertically extending support frames 126, each of which is hingedly attached, as by a hinge 127 at its upper end, to the overhead longitudinal girder construction 73 adjacent each hatchway 69 within the between decks area extending between the tank top deck 34 and the third deck 82, and which are spaced apart in the longitudinal direction of the ship at the appropriate respective locations of the container guides. The individual support frames 126 are as narrow as possible in the longitudinal direction and, as indicated by the dotted line showing in FIGURE 21, are swingable upwardly in the transverse direction to a horizontal position immediately under the deck 82, in which position they are secured by latch means (not shown) when the athwartship wing space at the level of the tank top deck is to be loaded with mixed cargo, or containerized or palletized cargo, lowered through the hatchway 69. Alternatively, and although not illustrated, the hinge connection 127 may be such that the guide frames 126 may be swung upwardly in either the fore or aft longitudinal direction of the ship. After loading of the wing space is completed, the frames 126 are swung downwardly and secured, as by lock means 128 at their bottom ends, to the tank top deck 34 and, thus, the bottom guide sections 124 are brought into vertical alignment with the respective guide sections 75 thereabove so that containers or pallets may be lowered fully to the bottom of the hatchway 69 and secured in position by the guide sections 124 as the containers or pallets are stacked upwardly from the tank top deck 34.

As also illustrated at the left hand side of FIGURE 21, similar bottom guide sections 124 an supporting frames 126 may be hingedly mounted in similar position within any between decks spacing, such as between the second deck 81 and the third deck 82 as shown, so that, for example, general mixed cargo may first be stowed within the between decks area below deck 82 whereupon the hatch covers 77 at deck 82 may be closed to form the lowermost between decks area within which containerized or palletized cargo is to be stowed. After loading the athwartship wing space at deck 82, the frames 126 within such lowermost container stowage area are swung downwardly into vertical position and locked to the deck 82 using the bottom end locking means 128, so that the otherwise open hatchway within the between decks area is provided with container guides 124.

Still another alternative mounting for each bottom guide section 124 is illustrated at the right hand side of FIGURE 21 and is shown in detail by FIGURES 26 through 28. This alternative provides a suitable number of individual, roller mounted supporting frameworks 129 to which each bottom guide section 124 is attached. As shown by FIGURES 26 through 28, at corner locations of the hatchway the framework 129 may have two bottom guide sections 124 attached thereto to respectively provide downward continuations of the container guides 75 and 76 to accommodate both sizes of container 71 and 72 within the hatchway. (Of course, two such adjacent bottom guide sections 124 might also be attached to the appropriate of the swingable type bottom guide frames 126 for the same purpose.) As most clearly indicated by FIGURES 26 and 27, each guide frame 129 has rollers 130 attached to its upper end for engaging a longitudinally extending roller track 131 which is suspended from the overhead adjacent the hatchway 69 within the between decks area in which the framework 129 is located. Thus, the respective frameworks 129 and their associated bottom guide sections 124 may be rolled in longitudinal direction of the ship to either the forward or after end of the cargo area when cargo is to be loaded within the wing space adjacent the hatchway, and may be thereafter rolled back to their respective positions for guiding and securing containers which are stowed within the hatchway 69.

Each of the individual container guide frames 129 is locked in either of these two contemplated positions by pin type locking devices, generally designated by reference numeral 132, at its upper and lower ends. At the lower end, the locking device is formed by two downwardly projecting pins 133 which are mounted for vertically slidable movement within respective sleeves 134 responsive to manual cranking of a jack mechanism 135, which has a crank handle 136. The jack 135 is attached to a fixed support 137 of the framework 129. Thus, when the handle 136 is rotated in appropriate direction, the jack 135 causes downwardly projecting movement of the pins 133 for their engagement with the respective pin receivers 138 which are in fixed position on the tank top deck 34. Continued operation of the jack mechanism 135, beyond the point where the pins 133 have firmly engaged the pin receivers 138, causes a lifting of the frame 129 so that the pair of upwardly projecting pins 139 at its upper end are brought into engagement with the respective upper pin receivers 140, which are attached in fixed position to the overhead, to securely lock the framework 129 in the desired position. In this connection, it will be noted that the rollers 130 will then be lifted off the roller track 131.

Of course, regardless of how mounted, the ends of the bottom container guide sections 124 are appropriately flared, as at 124a (FIGURE 27), to facilitate the guiding of containers therealong. In addiiton, and with respect to the positoning of any of the container guide sections 75, 76, 87, and 124 as have been described, their positions are such as to provide about ½" clearance (i.e., about 1" total clearance between the two confining guides) for sliding of containers and pallets.

In addition to the containers, pallets, and mixed cargo as has been described, and referring now to FIGURES 1, 3 and 25, the ship 30 is enabled to accommodate roll-on, roll-off cargo at its stern end by provision of one or more expansible ramps, generally designated by reference numeral 145, which may be extended outwardly through the side portals 58 to 61 at the level of the second deck 32, to a pier or floating barge or other dock facility 147 (FIGURE 25). As illustrated, the ship 30 includes two such ramps 145, both of which are roller mounted on a track 146 which is attached to the deck 32. The track 146 is substantially semi-circular in shape at the extreme after end of the ship where it lies adjacent to all of the portals 58 to 61, but may have additional straight sections (not shown) at the respective sides of the ship to continue past additional side portals of the ship, such as the portals 62 to 65, if desired.

Referring to FIGURE 25, it is seen that each ramp 145 includes three sections 145a, 145b, and 145c which are connected in tandem by hinges 148 to fold in accordion fashion as shown for retraction into the ship 30 from its extended position as indicated by dotted lines in FIGURE 25. The ramp section 145c is mounted for traverse on the track 146 as indicated, so that each damp 145, when retracted, may be rolled from the location of one portal to that of another, as indicated in FIGURE 3. In the embodiment shown, the two ramps 145 can thereby simultaneously service any combination of two of the portals 58 to 61, the ramps having width and load carrying capacity to support vehicular traffic moving on and off the ship.

Traffiic moving on and off the ship 30 via the ramps 145 generally moves in the direction of the arrow head indications in FIGURE 3, and through the roll-on cargo passageways 56 and 57 on deck 32, to any desired place of cargo stowage within the ship. Movement of vehicular traffic from deck 32 to any other deck 31, 33 or 34 is by way of traffic ramps 149 at either side of the ship in the area of hold No. 6 as seen in FIGURES 1 through 4 and 6. As most clearly indicated by FIGURE 1, each traffic ramp 149 is hinged at one of its ends 149a so that the same may be lowered, from its normal position flush with and forming a part of the deck 31, 32 or 33 in which it is mounted, to the deck below, as indicated. Of course, vehicular traffic entering through any of the side portals 62 to 65 (FIGURES 1 and 3) may also use the ramps 149 to move between the decks of the ship.

Thus, a cargo carrying vessel has been described, including several modifications thereof, which achieves all of the objects of the invention.

What is claimed is:

1. In a cargo carrying vessel having an upper deck and at least one lower deck, the improvement comprising hatch means in said upper deck for moving a horizontal cargo platform therethrough in vertical direction to and from said lower deck, the downwardly projecting area of said hatch means defining a vertical hatchway extending to the level of said lower deck, and at least one pair of guide means positionable on opposite sides of said hatchway to extend vertically upward from substantially the level of said lower deck within said hatchway for receiving said cargo platform between the pair and for guiding said platform in its said vertical movement, at least one member of said pair of guide means being movable out of its said position within said hatchway, each of said guide means when in its said position within said hatchway presenting a first vertical guide surface paralleling that side of the hatchway on which it is located and further having a laterally projecting portion defining a second vertical guide surface disposed substantially perpendicular to said first vertical guide surface whereby said first and second vertical guide surfaces together constrain said cargo platform during its said vertical movement against lateral movement in longitudinal and transverse directions of the hatchway.

2. The improvement according to claim 1 wherein one of said decks has track means extending laterally outward substantially from the confines of said hatchway, and at least one of the members of said pair of guide means has roller means for engaging said track means to provide rolling movement of the guide means memebr.

3. The improvement according to claim 2 wherein said member having roller means further has deck attachment means at the respective of its opposite ends for securing the member substantially to said decks above and below the same.

4. The improvement according to claim 3 wherein said deck attachment means at one end of said member comprises fixed pin means projecting therefrom, and said deck attachment means at the other end of said member comprises pin means mounted for movement between respective retracted and projecting positions thereof, said decks above and below said member each having pin receiver means for receiving the respective of said fixed and movable pin means of said member, the height of said member and its said fixed pin means being less than the clearance height between said decks which permits said rolling movement of the member, and said movable pin means when in its said projecting position providing engagement between both said fixed and movable pin means and said respective pin receiver means.

5. The improvement according to claim 1 wherein at least one member of said pair of guide means is mounted for pivotal movement about one of its ends between respective vertical and substantially horizontal positions thereof.

6. The improvement according to claim 5 wherein said pivotable member is mounted for pivotal movement about its upper end.

7. The improvement according to claim 6 wherein said pivotable member is mounted for pivotal movement about its lower end.

8. The improvement according to claim 1 wherein said lower deck has a pair of oppositely disposed plate means respectively mounted for vertical pivotal movement at opposite sides of said hatchway between respective vertical and horizontal positions of each plate means, the dimension of each said plate means in the direction of the plane of its said pivotal movement being substantially equal to the height between said lower deck and the underside of said upper deck, the members of said pair of guide means being respectively attached to the undersides of said plate means and extending in the direction of said dimension of its associated plate means, and means for securing said pair of plate means when in their said vertical positions to secure said guide means in their said upwardly extending positions.

9. The improvement according to claim 8 wherein said securing means comprises latch means adjacent respective opposite sides of said upper deck hatch means corresponding to said opposite sides of the hatchway, and latch receiver means on each said plate means for respectively engaging said latch means.

10. The improvement according to claim 9 wherein each said plate means includes a projecting portion which projects in the direction of its said dimension into, and comates with a cut-out portion of, the other of said plate means when both said plate means are in their said horizontal positions, and which projects upwardly into substantially adjacent relationship with the associated of said latch means when the plate means is in its said vertical position, said latch receiver means of the plate means being substantially disposed within the area of said projecting portion of the latter.

11. The improvement according to claim 8 wherein said lower deck has hatch means in vertical alignment with said hatch means of the deck thereabove to provide extension of said hatchway below said lower deck, and said pair of plate means comprises a pair of load-supporting hatch covers which, when in their said horizontal positions, at least partially close said lower deck hatch means.

12. The improvement according to claim 1 wherein each member of said pair of guide means includes means defining latch receiver means for engagement by laterally projecting latch means for said cargo platform when the latter is received between said pair of guide means.

13. The improvement according to claim 12 wherein said latch receiver means of each member of said guide means comprises a plurality of ledge means in spaced apart relation along the length of the member.

14. The improvement according to claim 1 wherein at least one member of said pair of guide means comprises vertically extending guide rail support means between said decks and adjacent to but outside the lateral confines of said hatchway, guide rail means mounted for movement on said guide rail support means between respective positions projecting into and out of the lateral confines of said hatchway, and means for inducing movement of said guide rail means between its said respective positions.

15. The improvement according to claim 14 wherein said guide rail support means comprises slide means, and said guide rail means comprises a vertically extending rail mounted on said slide means for slidable movement into and out from said confines of said hatchway.

16. The improvement according to claim 1 wherein said cargo carrying vessel has a second lower deck below the first said lower deck, the first said lower deck having hatch means in vertical alignment with said hatch means of said upper deck whereby the downwardly projected area of said first lower deck hatch means defines an extension of said hatchway to the level of said second lower deck, said first lower deck hatch means having a pair of oppositely disposed hatch covers respectively mounted for pivotal movement at opposite sides of said hatchway between respective vertical and horizontal positions of each hatch cover, the members of said pair of guide means being respectively attached to the underside of said hatch covers whereby said pair of guide means are in their said vertically extending positions when said hatch covers are in their said vertical positions, means for securing said hatch covers in their said vertical positions, and movable bottom guide means positionable in alignment with the respective of said pair of guide means to extend upwardly from substantially the level of said second lower deck within said hatchway extension to thereby substantially provide lower end continuations of the respective of said pair of guide means.

17. The improvement according to claim 16 which further comprises a pair of second movable bottom guide means between said upper and said first lower deck, said second movable bottom guide means being positionable oppositely when said hatch covers are in their said horizontal positions to extend vertically upward from substantially the level of said first lower deck within said hatchway for receiving said cargo platform means between the pair, each member of said pair of second bottom guide means being movable to a position substantially out of the lateral confines of said hatchway when said hatch covers are in their said vertical positions.

18. In a ship having a bow end, a stern end, a main deck, a tank top deck, and at least one intermediate deck between said main and tank top decks, the improvement comprising vertically aligned hatch means in the respective of said main and intermediate decks providing a cargo hatchway extending downwardly substantially to said tank top deck, each said hatch means having substantially removable load-supporting hatch cover means for passage of vehicles thereover, substantially removable guide means extending vertically within said hatchway for receiving and guiding van-type containers or the like to and from substantially the level of said tank top deck, said removable guide means comprising a pair of container guide elements positionable on opposite sides of said hatchway for extending between at least two of said decks, each of said container guide elements when in its said position within said hatchway presenting a first vertical guide surface paralleling that side of the hatchway on which it is located and further having a laterally projecting portion defining a second vertical guide surface disposed substantially perpendicular to said first vertical guide surface whereby said first and second vertical guide surfaces together constrain said guided containers or the like against lateral movement in longitudinal and transverse directions of the hatchway, and substantially removable ramp means extending between the respective of said main, intermediate, and tank top decks for passage of vehicles between all of said decks.

19. The improvement according to claim 18 which further comprises means defining an accessway through the hull structure of said ship at the level of one of said decks, and extensible vehicle ramp means on said one deck adjacent said accessway, said extensible ramp means having portions which are extensible with respect to each other through said accessway and outward of said ship to a docking facility, said portions being retractable with respect to each other for retracting the ramp means into said ship.

20. The improvement according to claim 19 wherein said accessway comprises a cargo portal located substantially at said stern end of the ship at the level of one intermediate deck thereof.

21. The improvement according to claim 20 which further comprises means defining a second accessway at the level of said intermediate deck of the ship, and said extensible ramp means is movable between said accessways for positioning the ramp means at either accessway.

22. The improvement according to claim 18 wherein said intermediate deck has at least one pair of oppositely disposed load-supporting hatch covers respectively mounted thereon for pivotal movement at opposite sides of its said hatch means between respective vertical and horizontal positions of each hatch cover, the dimension of said hatch means between its said opposite sides being substantially twice the distance between said intermediate deck and the deck thereabove, and each said hatch cover when in its said horizontal position extending substantially half said dimension of the hatch means whereby said pair of hatch covers closes said hatch means in the direction of its said dimension, each said hatch cover having means for detachably securing the same in its said vertical position, said substantially removable guide means comprises at least one pair of transverse container guide elements respectively attached to the undersides of said hatch covers and extending in the direction of said hatch means dimension, and said improvement further comprises at least one pair of longitudinal container guide elements respectively mounted adjacent the alternate opposite sides of said hatch means and extending vertically within said hatchway between said intermediate deck and the deck thereabove.

23. The improvement according to claim 22 wherein that edge of each said hatch cover which is adjacent to one of said longitudinal container guide elements has means defining a cutout of the hatch cover for passing said longitudinal container guide element during movement of the cover between its said horizontal and vertical positions, and flap means hingedly mounted on said hatch cover adjacent its said cutout for substantially covering the area of the cutout when said hatch cover is in its said horizontal position.

24. The improvement according to claim 22 wherein each said longitudinal container guide element is movable from its said position within said hatchway to a second position thereof which is outside of the lateral confines of said hatchway.

25. The improvement according to claim 22 which further comprises respective and substantially removable bottom guide elements extending vertically within said hatchway between said intermediate deck and said tank top deck and in alignment with each of said transverse container guide elements when said hatch covers are in their said vertical positions to substantially provide respective continuations of said transverse container guide elements to said tank top deck, and respective bottom longitudinal container guide elements within said hatchway between said intermediate deck and said tank top deck and in alignment with each of the first said longitudinal container guide elements to substantially provide respective continuations of the latter to said tank top deck.

26. The improvement according to claim 25 wherein said intermediate deck has two of said pairs of hatch covers in side by side relation for closing said hatch means when the members of both said pairs of hatch covers are in their said horizontal positions, each hatch cover of each pair having an even plurality of said transverse container guide elements attached thereto in spaced apart relation with respect to each other and in oppositely disposed relation with the respective of said plurality of transverse container guide elements on the opposite hatch cover in the hatch cover pair whereby van type containers may be slidably received between four of said transverse container guide elements, there being an even plurality of said longitudinal container guide elements mounted adjacent each of said alternate opposite sides of said hatch means in spaced apart relation to each other and in oppositely disposed relation with the respective of said plurality of longitudinal container guide elements mounted adjacent the other of said alternate opposite sides of the hatch means whereby van type containers may be slidably received between four of said longitudinal container guide elements, said hatch means having vertically extending filler guide means attached thereto in alignment with, and between each of said transverse and longitudinal container guide elements and the respective of said bottom container guide elements therebelow, said hatch means in said main deck having a plurality of container lead-in devices mounted thereon for guiding said containers into slidable relation with the appropriate of said transverse and longitudinal container guide elements.

27. The improvement according to claim 26 wherein said main deck hatch means has upwardly projecting coaming providing a peripherally extending and outwardly facing edge spaced above said main deck, and vertically extending filler guide means attached thereto in alignment with each of said transverse and longitudinal container guide elements therebelow, and each said lead-in device has a lead-in surface extending in upwardly and outwardly direction from said hatchway, each said device being hingedly mounted on said edge of the coaming for pivotal movement away from said hatchway to a position within said spacing of the coaming edge above said main deck.

28. A cargo platform having latch means for supporting the platform in horizontal position between at least one pair of upstanding and horizontally spaced apart supports, said latch means comprising a plurality of individual latches corresponding to the number of and for respective association with said supports, each said latch being mounted adjacent an edge of said platform and for vertical pivotal movement between laterally projecting and retracted positions with respect to the platform edge, each said latch presenting a downwardly facing surface for engaging its associated support when the latch is in its said projecting position, and latch actuating mechanisms respectively associated with each said latch, each said mechanism comprising spring means normally biasing its said associated latch to its said projecting position, stop means for holding said latch in its said projecting position, hinge means mounted for pivotal movement on said platform and having an end for engaging and thereby restraining said latch against bias responsive movement when in its said retracted position, spring means biasing said hinge means to its said latch engaging position, and latch actuator means mounted on said platform and comprising means for pivoting said hinge means against its said bias to release its said engagement with said latch when the latter is in its said retracted position.

29. A load-supporting type hatch cover having hinge means on one of its edges for mounting the same on a cargo hatch of a ship for pivotal movement between a horizontal position and an upwardly extending vertical position with respect to the hatch, and at least one container guide element attached to its underside, each said guide element extending substantially across said hatch cover in direction outwardly from its said one edge whereby the guide element is vertically disposed when the hatch cover is so mounted and in its vertical position.

30. A pair of comating load-supporting type hatch covers, each said hatch cover having hinge means on one of its edges whereby the pair of hatch covers is adapted for mounting on opposite sides of a cargo hatch of a ship for pivotal movement between comating horizontal positions and respective upwardly extending vertical positions with respect to the hatch, the dimension of each of said hatch cover in the direction outward from its said one edge being substantially equal to the other and such that said pair of hatch covers spans across and closes the spacing between said sides of said hatch when the hatch covers are in their said comating horizontal positions, a pair of laterally spaced apart container guide elements attached to the underside of each said hatch cover, each said guide element extending substantially across its said associated hatch cover in direction outwardly from said one edge of the latter whereby said guide elements are vertically disposed when their said associated hatch cover is so mounted and in its said vertical position, said pair of spaced apart guide elements on each said hatch cover being oppositely disposed with respect to the pair of guide elements on the other of said hatch covers when the latter are so mounted, each said hatch cover having a projecting portion and means defining a cut-out portion on the edge thereof which is opposite its said one edge whereby said projecting portion of either hatch cover projects into and comates with said cut-out portion of the other hatch cover when said hatch covers are so mounted and in their said horizontal positions, and each said hatch cover having connection means for securing the same in its said vertical position, said connection means of each said hatch cover being disposed substantially within the area of its said projecting portion.

31. A removable container guide section for mounting within a between decks spacing of a cargo ship for use at a hatchway in guiding van-type containers or the like when moved vertically within such hatchway, said container guide section comprising frame means having height substantially equal to said between decks spacing, a container guide element attached on one side of said frame means and extending substantially said height thereof, and connection means on the respective opposite ends of said frame means for connecting said frame means in vertical position to the respective deck structures which define said between decks spacing.

32. A removable container guide section according to claim 31 wherein said connection means on at least one of said frame means ends comprises pin means mounted for movement between respective retracted and projecting positions thereof.

33. A removable container guide section according to claim 31 wherein said connection means on one of said frame means ends comprises hinge connection means.

34. A container guide section for mounting within a between decks spacing of a cargo ship adjacent a hatchway and for guiding van-type containers or the like when moved vertically within such hatchway, said container guide section comprising guide rail support means having height substantially equal to said between decks spacing, guide rail means mounted for lateral movement on said guide rail support means between respective retracted and laterally projecting positions with respect to the latter, and means between said support means and said guide rail means for inducing said movement of the latter.

35. A container guide section according to claim 34 wherein said support means has substantially U-shaped cross-sectional configuration providing recessed lateral slide means, said guide rail means being mounted for slidable movement on said slide means, and said means for inducing said movement of said guide rail means comprises hydraulic ram means.

36. The improvement according to claim 16 wherein said movable bottom guide means comprises individual guide means members at least one of which is hingedly attached substantially to the underside of said first lower deck adjacent said hatchway extension for upward pivotal movement.

References Cited

UNITED STATES PATENTS

| | | | |
|---|---|---|---|
| 2,181,279 | 11/1939 | McLauthlin | 214—15 |
| 2,247,144 | 6/1941 | Baldwin | 214—14 |
| 2,923,265 | 2/1960 | Pontoni et al. | 114—73 |
| 2,979,007 | 4/1961 | Kummerman | 114—72 |
| 3,111,104 | 11/1963 | Seymour et al. | 114—72 |
| 3,138,131 | 6/1964 | Szychlinski | 114—72 |

FERGUS S. MIDDLETON, *Primary Examiner.*

MILTON BUCHLER, *Examiner.*

T. M. BLIX, *Assistant Examiner.*